(12) United States Patent
Pinatti et al.

(10) Patent No.: US 8,603,404 B2
(45) Date of Patent: Dec. 10, 2013

(54) APPARATUS AND PROCESS FOR THERMAL DECOMPOSITION OF ANY KIND OF ORGANIC MATERIAL

(75) Inventors: Daltro Garcia Pinatti, Lorena (BR); Isaías Oliveira, Village das Palmeiras (BR); Álvaro Guedes Soares, Lorena (BR); Érica Leonor Romão, Lorena (BR); João Carlos Ferreira, Lorena (BR)

(73) Assignee: RM Materials Refratarios Ltda., Lorena (BR)

( * ) Notice: Subject to any disclaimer, the term of this patent is extended or adjusted under 35 U.S.C. 154(b) by 103 days.

(21) Appl. No.: 13/124,793

(22) PCT Filed: Oct. 16, 2009

(86) PCT No.: PCT/BR2009/000321
§ 371 (c)(1),
(2), (4) Date: Aug. 30, 2011

(87) PCT Pub. No.: WO2010/043011
PCT Pub. Date: Apr. 22, 2010

(65) Prior Publication Data
US 2011/0315349 A1    Dec. 29, 2011

(30) Foreign Application Priority Data

Oct. 16, 2008 (BR) .............................. PI 0804349-3

(51) Int. Cl.
*B01J 19/00* (2006.01)
*B01J 8/00* (2006.01)
*F28D 7/00* (2006.01)
*C07C 1/00* (2006.01)
*C07C 4/00* (2006.01)
*C10G 1/00* (2006.01)

(52) U.S. Cl.
USPC .......... 422/198; 422/129; 422/130; 422/187; 422/200; 422/241; 585/240; 585/241; 585/242; 201/13; 201/14

(58) Field of Classification Search
USPC ......... 422/129, 130, 187, 198, 200, 241, 600, 422/603; 585/240–242; 201/13, 14
See application file for complete search history.

(56) References Cited

U.S. PATENT DOCUMENTS

| | | |
|---|---|---|
| 5,095,040 A | 3/1992 | Ledford |
| 5,628,260 A | 5/1997 | Rongved |

(Continued)

FOREIGN PATENT DOCUMENTS

| | | |
|---|---|---|
| GB | 233 335 A | 7/1925 |
| GB | 330980 | 6/1930 |

(Continued)

OTHER PUBLICATIONS

English translation of JP 58-013693 A, which was published Jan. 26, 1983.*

(Continued)

*Primary Examiner* — Prem C Singh
*Assistant Examiner* — Natasha Young
(74) *Attorney, Agent, or Firm* — Alston & Bird LLP

(57) ABSTRACT

A Low Temperature Conversion apparatus composed of tri-tubes which simultaneously carries out the functions of vessel and heat exchanger is provided. The apparatus is capable of thermally decomposing any kind of organic material to obtain coal, oil, water and non-condensable gases, and also decontaminating soils and residues contaminated with organochlorides and dioxins and comprises: an outer box (2) with a hermetic lid (19); a thermal insulation layer (5) disposed throughout the inner surface of the outer box (2) and lid; and at least a structure with three concentric tubes disposed internally, positioned substantially vertically and with a wall width suitable for heating by means of gases from an inner side and outer side of said structure. An associated process for thermal decomposition using the apparatus is also provided.

29 Claims, 7 Drawing Sheets

(56) References Cited

U.S. PATENT DOCUMENTS

| | | | |
|---|---|---|---|
| 6,585,899 B1* | 7/2003 | Edvardsson et al. | 210/763 |
| 7,789,999 B2* | 9/2010 | Lee | 201/14 |
| 2003/0051649 A1* | 3/2003 | Smith | 110/341 |
| 2008/0279728 A1* | 11/2008 | Turc et al. | 422/119 |
| 2010/0326811 A1* | 12/2010 | Tokuda et al. | 201/2.5 |

FOREIGN PATENT DOCUMENTS

| | | |
|---|---|---|
| GB | 362522 | 12/1931 |
| JP | 56 115386 | 9/1981 |
| JP | A-58013693 | 1/1983 |
| JP | 10001678 A * | 1/1998 |
| JP | 10 279950 | 10/1998 |
| KR | 846897 B1 * | 7/2008 |
| RU | 2 078 111 C1 | 4/1997 |
| WO | WO 2005/121278 A1 | 12/2005 |
| WO | WO 2008/081598 A1 * | 7/2008 |

OTHER PUBLICATIONS

Machine translation of JP 10-001678 A, which was published Jan. 1998.*
International Search Report, mailed Aug. 12, 2010, of corresponding international Application No. PCT/BR2009/000321, filed Oct. 16, 2009.
Written Opinion, mailed Aug. 12, 2010, of corresponding international Application No. PCT/BR2009/000321, filed Oct. 16, 2009.
Reply to Written Opinion, dated Nov. 12, 2010, of corresponding international Application No. PCT/BR2009/000321, filed Oct. 16, 2009.
Request for PCT Demand, dated Nov. 12, 2010, of corresponding international Application No. PCT/BR2009/000321, filed Aug. 16, 2009.
International Preliminary Report on Patentability, mailed Jan. 26, 2011, of corresponding international Application No. PCT/BR2009/000321, filed Aug. 16, 2009.

* cited by examiner

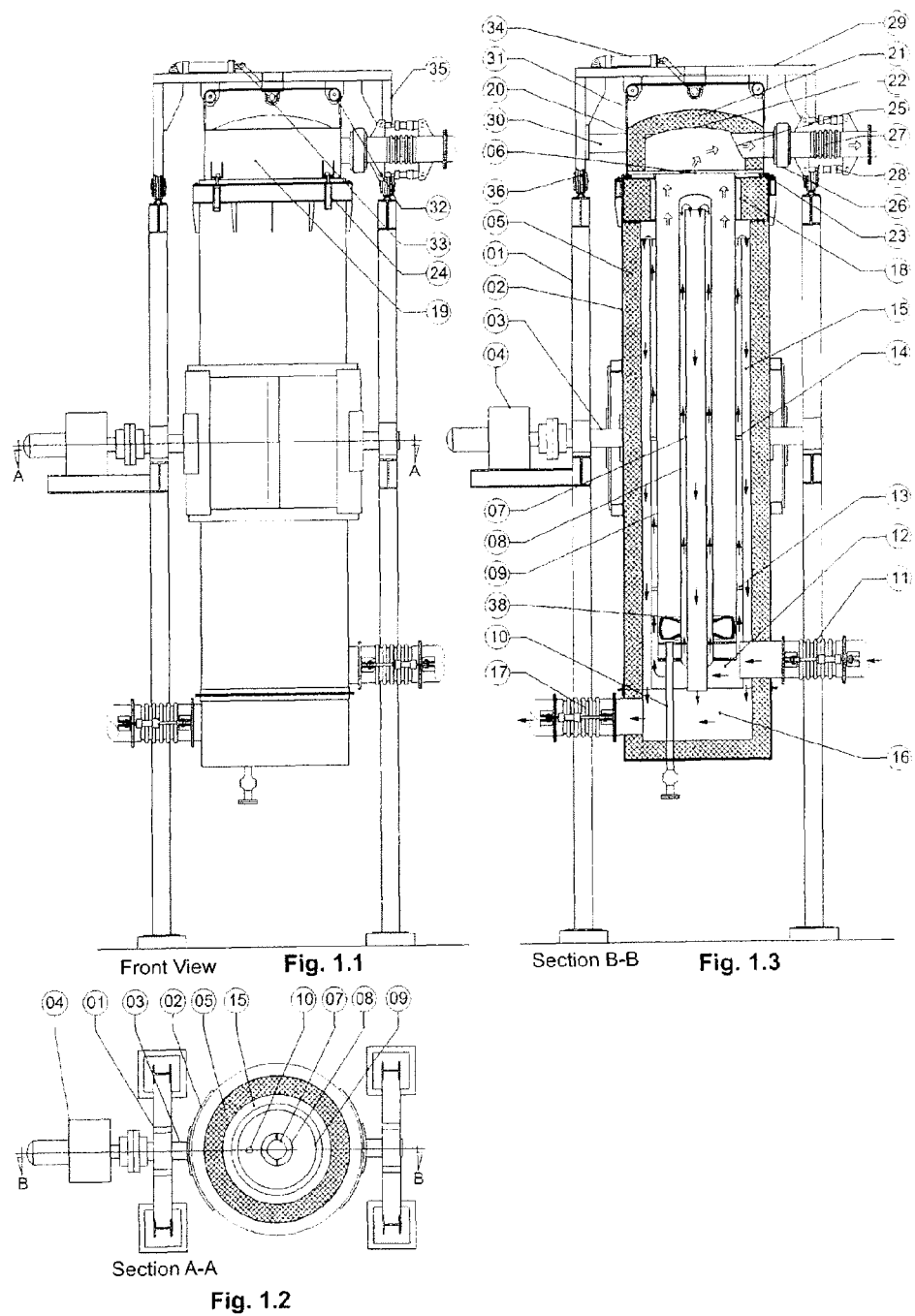
Front View  Fig. 1.1
Section B-B  Fig. 1.3
Section A-A
Fig. 1.2

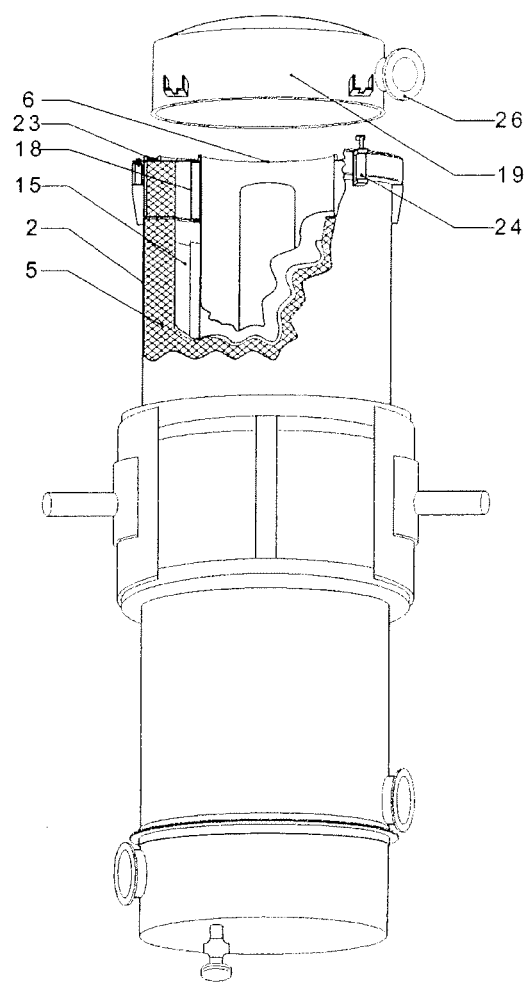
Fig. 1.4

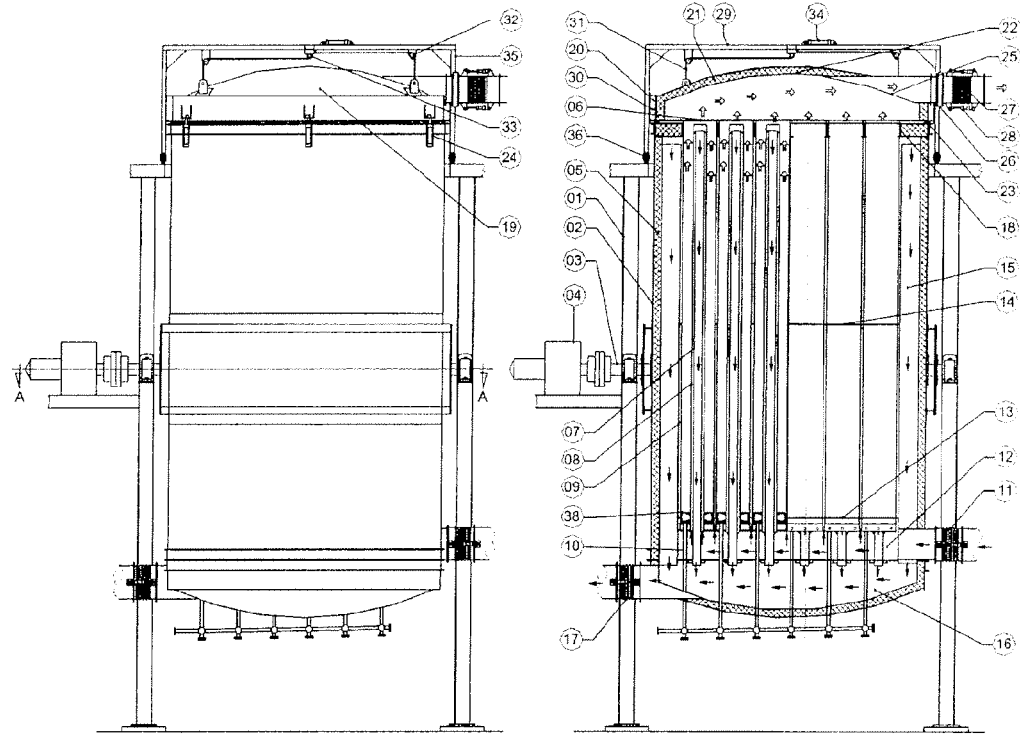
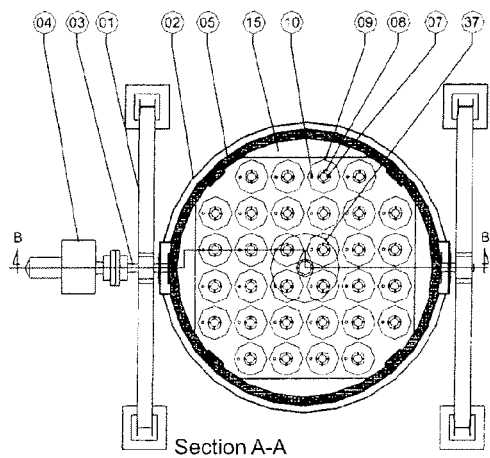
Front View  Fig. 2.1
Section B-B  Fig. 2.3
Section A-A
Fig. 2.2

APPARATUS AND PROCESS FOR THERMAL DECOMPOSITION OF ANY KIND OF ORGANIC MATERIAL

CROSS REFERENCE TO RELATED APPLICATIONS

This application is a national stage application, filed under 35 U.S.C. §371, of International Application No. PCT/BR2009/000321, filed Oct. 16, 2009, which claims priority to Brazilian Patent Application No. PI0804349-3, filed Oct. 16, 2008, all of which are hereby incorporated by reference in their entirety.

BACKGROUND OF VARIOUS EMBODIMENTS OF THE INVENTION

1. Field of Invention

The present invention refers to an apparatus for thermal decomposition (dissociation) of any kind of organic material (biomasses, sludges, organic lees, cakes, brans, dry vinasse, composts, animal excrements, unusable tires, polymers in general, peat, etc.) to obtain commercial products such as oils (with fatty fractions, diesel, aromatics, limonene, tars, etc.) and coals (of the vegetable, lignite, bituminous, carbon black—NFR type, etc). The apparatus of this invention also enables the destruction of products and soils contaminated with oils, organochlorinated hydrocarbons and dioxins.

2. Description of Related Art

Japanese patent JP 56115386 dating from 1981 describes apparatus for carbonizing old tires to generate heat. This is carried out by burning the gas generated to obtain coal without worrying about the recovery of the carbon black contained in the raw material. In other words, this apparatus does not allow the use of the reaction products which are the coals, recovered carbon black obtained when the raw material is tires, and oil. In the Japanese patent JP56115386, the tire is heated by direct contact of the combustion gas with the material to be processed, by way of the holes 5. In point of fact, the apparatus described in this Japanese patent is a simple gasifier with three concentric vessels.

The present patent application describes an apparatus which allows the use of the reaction products, which are the coals (recovered carbon black obtained when the raw material is tires) and the oil. The constructive concepts of the Japanese patent JP 56115386 and of the present patent application are entirely different. Heating the tires (or any other raw material) in the present invention is performed indirectly by tri-tube technology (three concentric tubes). The raw material is placed in the space between the intermediary tube of the tri-tube and outer tube of the tri-tube and the heating gas passes through the area between the intermediary tube of the tri-tube and the inner tube of the tri-tube and also through the outer region of the tri-tube. The present invention is a hermetic apparatus which reproduces the geological formation conditions of coal, petroil and gases in the subsoil (as per Ernest Bayer), its fractionings, streamlined loading, unloading, low consumption of energy, investment cost, operational and processing of any kind of organic material including whole tires.

British patent GB 362.522 dating from 1931 describes a machine that is operated on a batch regime for "carbonization at average temperature" in the range of 590° C. to 700° C. Above 500° C. the processes are pyrolytic (gasifications) and below 500° C. are low temperature conversions (cracking+ synthesis). It is noted that the range of usual operation of the present invention is between 380° C. and 420° C. It is noted that below 380° C. the reaction is very slow and not economically viable and above 420° C. there begins the thermal decomposition of most of the oil generated by the process. Still regarding the British patent, it is important to note that once the reaction is over, there is a major difficulty in unloading the coke produced, because it adheres to the reactor walls. The following two measures are designed to overcome this problem:

a) the volume of the coking chamber is increased by movement of the hollow walls 2 which are articulated at one of its ends (FIG. 1). The product is disposed between pairs of boards and the heating is carried out in the space between the pairs of boards;

b) the machine has a device to push the coke which is added when the hollow walls are moved and at the same time the articulated doors in the lower part of the coking chamber are opened to allow coke unloading.

The present invention solves the problem of coal unloading in a simple and different manner: once the reaction is over, the reactor closing lid, which is mounted on a cart on rails, travels whereby releasing the reactor, the entire equipment is tilted around its horizontal axis (which passes through the center of gravity of the apparatus) describing an angle of about 180 degrees. The feed mouth of the tri-tube, which in the feeding and reaction steps faces upwards, on unloading faces downwards and becomes an unloading mouth. So the main differences between this patent and the present invention are:

1) patent GB 362.522 has upper loading and lower unloading. The present invention has merely an upper tilting lid for unloading, viewing maximum possible hermeticity;

2) patent GB 362.522 is not hermetic. The present invention is hermetic;

3) patent GB 362.522 only applies to the production of coke from coal mineral. The present invention applies to various raw materials which produce different types of oils and coals;

4) the machine of patent GB 362.522 is for sequential loading and unloading (almost continuous). That of the present invention is by batch.

Japanese patent JP 10279950 dating from 1998 describes equipment for carbonizing old tires, waste vinyls, wood shavings, etc. The equipment has a vertical construction and is comprised of an outer oven and an inner over concentric to the former. The inner oven has an upper protrusion in relation to the outer oven. The constructive concepts of the Japanese patent JP 10279950 and of the present invention are entirely different. The problem of feeding the raw material and unloading of products in the Japanese patent is solved by bins introduced via the upper flange, which is installed on the protruding part of the inner tube. In the present invention there is no bin and the unloading is by tilting. The bin of patent JP 10279950 is divided into three parts: lower B1, intermediary B2 and upper B3. The lower part is closed to prevent the escape of coal and the upper and intermediary parts have holes which allow the product to be unloaded.

In the present invention, the problem of unloading the product is solved by the equipment's tilting system. Once the reaction is over, the reactor closing lid which is mounted on a cart on rails travels whereby releasing the reactor, the whole equipment is tilted around its horizontal axis (which passes through the center of gravity of the apparatus) describing an angle of about 180 degrees. The feed mouth of the tri-tube, which in the feeding and reaction steps faces upwards, on unloading faces downwards and becomes an unloading mouth. A major problem of the equipment of the Japanese patent is having a single tube which if applied to industrial quantities implies large diameters. The carbonized material in the outer wall of the inner tube acts as thermal insulation for the material situated in the central part, requiring several hours and even days to finish the process, the apparatus thus being of little use for any industrial application. The apparatus of the present invention, besides various additional characteristics, solved the issue of processing time by way of the tri-tubes with internal and external heating of the raw material situated in the annular part, which results in small material width and processing times of around 3 hours, thus allowing industrial capacity to be achieved. It should be noted that the present invention also comprises the possibility that gases used in the reaction may be at different temperatures in an alternative embodiment of the invention.

British patent GB 330.980 dating from 1929 describes equipment for carbonizing coal mineral, peat, wood, etc. The constructive concepts of the British patent GB 330,980 and of the present patent are entirely different, starting with the operating principle which is continuous in the first and by batch in the second. British patent GB 330,980 describes an apparatus comprised of various vertical stationary containers (retorts) mounted according to a carrousel-type toroidal symmetry. Around this retorts carrousel is a bell with an annular profile forming a tunnel which covers the retorts carrousel. This tunnel is mounted on rollers and rails, has periodic circular movement and is insulated by a sand bath. The tunnel has loading, heating and cooling regions. Accordingly there is established the continuous operation of the equipment. Each retort also has an upper port for loading and a lower port for unloading the coal into a bin and each set of three retorts has a stationary piping for the outflow of vapors (subproducts). Through this collector piping, there are withdrawn the vapors generated in the process which are conveyed to a distillation plant. There is nothing in the British patent that resembles the figure of the tri-tube which is the main characteristic of the equipment of the present invention, the arrangement of which is cylindrical, vertical and completely different mechanical elements and processes. The lack of hermeticity and the temperature of the reaction mean that the end product of the British patent is completely different to that of the present invention.

U.S. Pat. No. 5,095,040 dating from 1992 is a process patent. It describes the use of conventional equipment (tire shredders, shaking screens, electro-magnets, storage hoppers, rotary ovens, burners, temperature controllers, condensation tower with content, oil tanks and chimney) for the thermal processing of old tires, in an environment free of atmospheric air, but non-hermetic. The process sequence is as follows: a) tire shredding; b) sorting the fine pieces sized between 1.27 cm (½") to 1.9 cm (¾") and discarding of coarse material including metal; c) silo tampon of raw material (small pieces); d) carbonization in rotary oven in the absence of atmospheric air; and) recovery of the solid product (porous coal); f) condensation of vapors generating oil and g) burning or chimney disposal of the non-condensable gases. In the North American patent there is no mention of the characteristics and applications of the solid product (porous coal). In the present invention, processing biomass containing lipids, proteins and lignocellulosics produces coal and processing tires produces recovered carbon black (NFR). The chemical composition and the applications of the oil is also not cited, but rather their physical properties 41.8 MJ/kg (18,000 BTU/pound), specific gravity of 0.90, pour point of −7° C. and boiling point of 112° C. (oil # 4). The non-condensable gases are conveyed to the chimney or are burnt in one or more burners. The main process step is the carbonization of rubber which is carried out in a rotary oven comprised of a stainless steel tube having the following dimensions: diameter=609 mm, length=6.300 mm and width of the stainless steel sheeting of 11.1 mm. The tube presents raising wings and material drag and slanting in the range of 5 to 10 degrees, the feeder mouth being higher than the unloading mouth for outflow of the material in process and to hinder the entry of air into the over. The rotation is slow in the order of 3 rpm. The residence time of the material processed in the rotary oven is 7 to 8 minutes resulting in an estimated production of 2 to 3 t/h due to the low rate of filling the rotary ovens. The rotary oven is surrounded by a thermally insulated box where there are installed burners directed towards the lower part of the rotary tube. Temperature sensors are installed in the body of the tube to keep the temperature at the desired conditions which are: entry of the rubber: 480° C. to 540° C., region central: 480° C. and coal outflow: 425° C. to 440° C. The smoke 34 leaves the reactor in the temperature range of between 160° C. and 190° C. and the condensation tower operates in the range of 60° C. to 70° C. The estimated heating rate is 125° C./min falling in the inert rapid pyrolysis rate. U.S. Pat. No. 5,095,040 highlights that the use of a rotary oven with smooth walls, instead of systems of belts or propeller conveyors, avoids locking problems due to the adhesive characteristic of the material processed. U.S. Pat. No. 5,095,040, therefore, has no characteristic resembling the present invention. The present invention describes new equipment and consequently a new process, which is not pyrolysis, because it is below 500° C. and in an inert atmosphere (totally free of $O_2$), from whence the name low temperature conversion. In the process used by the present invention there occurs cracking and synthesis simultaneously permitted by the residence time of 60 to 90 minutes and, accordingly, results in maximization (increase in quantity) and improved quality of the oils. The main equipment needed to develop the process described in the North American patent is a conventional rotary oven which is a machine having constructive characteristics entirely different from the heat exchange-type reactor with tri-tube beams defined in the present invention. Operations of the rotary oven are continuous and the reactor of the present invention is by batch.

JP-A-58013693 describes the equipments and apparatus of a tire pyrolyzer formed by three concentric tubes receiving the heating gas from the burning of gaseous fuels in a furnace located at the bottom of the equipment. In this device, the heating gas flow firstly enters upwardly in the 1st inner tube, then passes downwardly through the space between the 2nd inner tube and the 1st inner tube. In this step, it occurs part of the heat transfer. At last, the heating gas flow passes upwardly between the outer tube and thermal insulation wherein the remainder of the heat exchange occurs. Steams and gases are extracted through pipe 17 to be condensed in tower 31. In this document, there is no mention to how the coal is unloaded. However, the technology disclosed in this prior art document (JP-A-58013693) it is not capable of performing the thermal cycling (steps of heating, converting and cooling) which allows the production of 3 to 4 batches per day.

WO2005/121278 refers to a process which discloses the equipments and apparatus of a depolymerizer of used tires that is characterized by a thermally insulated vessel wherein the fed tire inside the same is submitted to the pyrolysis process through direct contact among the heating combustion gas as well as the heating medium that is calcium oxide. The steams and gases go to a condensate column and non condensable gases are burned in a hot gas generator. Coal or tire is depolymerized along with the heating medium by tilting. The disclosed reactor transfers heat directly to the reaction medium in an oxidative process, and is not capable of indirectly transferring heat to the tire in a reducing process.

GB 233.335 discloses the equipments and apparatus for carbonization and distillation of wood that is characterized by being a retort wood pyrolyzer. The pyrolyzer has a thermally insulated metal box supported by two bearings having a further vessel inside the same, wherein wood is located. The heating means of this equipment is the combustion gas and the pyrolysis gas itself that returns in the process (retort) transferring heat directly to the wood through the existing holes in the inner vessel. No steams or oils are generated in the process. The coal formed is unloaded by tilting of the insulated metal box.

OBJECTIVES OF VARIOUS EMBODIMENTS OF THE INVENTION

It is an objective of the present invention to provide an apparatus with a geometry of multiple tube trios having fine walls called tri-tubes which simultaneously execute the functions of chemical reactor and heat exchanger.

It is an objective of the present invention to keep the atmosphere in the annular region of the tri-tube free of oxygen to avoid oxidation of the raw materials and products during the chemical reaction.

It is another objective of the apparatus of the present invention to have thermally-insulated outer walls to decrease the consumption of thermal heating energy for a chemical reaction.

It is an objective of the present invention to load the raw materials and to unload the solid products quickly.

It is another objective of the apparatus of the present invention to convert the raw materials containing lipids and proteins (jointly or separately) into oil, coal and non-condensable gases.

It is another objective of the apparatus of the present invention to convert the lignocellulosic raw materials into oils (tar), coal, water and non-condensable gases.

It is another objective of the apparatus of the present invention to convert tires and rubber in general into oil (containing fractions of limonene and aromatics), recovered carbon black (containing original carbon black original and the ashes (compounds of zinc and sulphur, silicon, aluminum, iron, titanium, potassium, etc.) used in manufacturing rubbers) and non-condensable gases.

It is another objective of the apparatus of the present invention to convert plastics and polymers in general in their monomers (ethene, propene, styrene, etc), coals, ashes (compounds of zinc and sulphur, silicon, aluminum, iron, titanium, potassium, etc.) and non-condensable gases by cooling at freon or cryogenic temperatures.

It is another objective of the apparatus of the present invention to treat contaminated soils or other materials with organochlorides and dioxins and furans (PCB, HCB, PCDD and PCDF) in order to obtain a resulting decontaminated material.

It is another objective of the apparatus of the present invention to obtain purer separated ducts by fraction condensation or an even purer result than usual in order to allow uses of the resulting products differing from those listed in the energy field.

SUMMARY OF VARIOUS EMBODIMENTS OF THE INVENTION

The present invention refers to a CBT reactor which allows the simultaneous realization of the functions of a vessel and a heat exchanger and its chemical reactions and thermal exchanges. The reactor is constituted of square arrangements (or any other geometrical shape) of three concentric tubes in the tri-tube configurations up to a number of tri-tubes that is technically and economically viable. In other words, the defining factor for the quantity of tri-tubes is a technical and economic analysis of the project to be implemented.

The tube trios of the present invention, called tri-tubes, are disposed vertically with loading of raw material by hoppers, through the upper part and unloading of the solid products by tilting the reactor. In the tri-tube arrangement, the hot heating gas enters simultaneously by the outer wall of the tri-tube by the region between the inner tube and intermediary tube of the tri-tube and leaves by the smallest inner tube called bayonet. This arrangement allows the temperature difference $\Delta T$ between inflow and outflow of the hot heating gases in a process regime to be just $\Delta T=415-400=15°$ C. conferring the characteristic of isothermal reactor. The tubes are preferably made of stainless steel 310, and other steels can be used that are resistant to average temperatures (380° C. to 450° C.).

The total flow regime of the CBT Reactor (including all the processing steps—from loading to unloading) is by batch and lasts approximately 6 to 8 hours, depending on the raw material. The batch steps are: feeding, heating, processing with extraction and condensation of the oil, cooling, tilting and processing of the coal. In each batch, the reactor is kept hermetic, free of oxygen, using $N_2$ or $CO_2$ as drag gas. The raw material is dried in an external dryer to an approximate minimum of 95% dried matter.

The process phases are as follows: the solid phase of the reaction which occurs in the annular region, between the outer tube and the intermediary tube, has inorganic catalysts that are part of the raw material itself ($SiO_2$, $Al_2O_3$, $FeO_3$, $TiO_2$, $K_2O$, Zn, etc.). The vapors phase (vapors of tars, fatty oil, diesel, aromatics, limonenes, monomers of hydrocarbons and water) and the non-condensable gases phase ($CO$, $CO_2$, $H_2$, $CH_4$, $N_2$, etc. which are produced during conversion. It must be noted that external catalysts can be mixed to the raw materials during drying in rotary ovens, fluid beds or turbodryers. The existing phases, outside the outer tube and inside the intermediary tube and inner tube, comprise combustion gases from the hot gas generator generated externally for heating the CBT Reactor.

The movement conditions of the materials during the period of a reaction inside the CBT reactor are: 1) Raw material—Upper loading via hoppers in 240 seconds; 2) Solids (raw material being converted)—Fixed bed during the batch processing period of 6 to 8 hours; 3) Vapors and non-condensable gases—Extraction by the annular region of the tri-tube also during the batch period of 6 to 8 hours; 4) Heating Combustion Gas and cooling air—Continuous flow with residence period of 8 seconds; 5) Coal—Unloading by tilting in approximately 120 seconds. The vapors and non-condensable gases can have an upwards or downwards flow (extraction by purge of $N_2$) in the annular region, the latter being designed to widen the contact thereof with the catalysts present in the solid mass.

The diameter of the raw material used in the reactor of the present invention goes from submillimetric particles (brans, cakes, lees, sludges, excrement), centimetric for bulks (shavings, shredded plastics) and briquettes (remainder of agricultural reforestry, sawmills and grasses) and metric particles for tires from cars, trucks and tractors that are treated whole, without the need for shredding. For truck tires, 4 or 5 tubes of Ø=650 mm could be substituted for a single tube of approximately Ø=1.350 mm whose larger size demands a greater processing period. It should be noted that the sizes of the tri-tube may vary according to the specific needs. The greatest demand is for car tires. Materials with apparently low density are previously briquetted in cylindrical or toroidal forms having diameters similar to those of car tires.

The heat transfer rate and mass of the CBT reactor constitutes significant ingeniousness of the present invention. The major fraction of products involved in the reaction is coal (40 to 60%), a thermal insulator that hampers the transfer of heat for conversion. The present invention solves this issue by way of tri-tubes with heating from the outside and inside of the annular region keeping the heat transmission width lower than approximately 175 mm permitting a reduction in the conversion period to approximately 3 hours, this being 4 to 10 times lower than conventional carbonization ovens. A good mass processing rate is achieved with apparently specific average volumes of the raw materials processed (Table 1). There is a fortunate coincidence between the optimal annular width for heat transmission (175 mm) and the width of tires of passenger vehicles integral, dispensing the need for costly shredding operations.

The temperature control is excellent due to the continuous heating with combustion gas of the hot gas generator and the metal conductivity of the tri-tube beam of the CBT reactor. The hot gas generator can use any kind of fuel (biomass, oil, gas natural or GLP). Thermal cycling (steps of heating, converting and cooling), allows the production of 3 to 4 batches per day.

The present invention can be considered as an apparatus for thermal decomposition of any kind of organic material comprising an outer box with hermetic lid, a thermal insulation layer disposed throughout the inner surface of the outer box and lid, and also comprising at least a structure with three concentric tubes disposed internally, positioned substantially vertically and with a wall width suitable for heating by means of gases from the inside and outside of said structure.

The structure with three concentric tubes comprises an inner tube, an intermediary tube and an outer tube and is heated on the outside and inside of the annular region of the tubes. The spacing between the inner wall of the outer tube and the outer wall of the intermediary tube is approximately 175 mm. The structure with three concentric tubes has substantially thin walls the width of which varies from 2 to 5 mm, preferably, 3 mm and a length substantially equal to that of the apparatus.

The heat flow for heating transferred by conduction to the three concentric tubes occurs simultaneously from the inside of the intermediary tube to the center of the annular region of the three concentric tubes and from the outside of the outer tube to the center of the annular region of the three concentric tubes, the gases used for heating have no physical contact with the material to be decomposed. Heating by hot gases in a process regime allows the difference in temperature between the inflow and the outflow of the gases to be approximately 15° C.

Note that said apparatus is a batch operation reactor.

The material used in the outer box is preferably carbon steel. The material used in the concentric tubes is preferably stainless steel 310, and other materials can be used that are resistant to average temperatures of between 380° C. and 420° C. The material used inside the outer box and lid is preferably a refractory blanket for thermal insulation of the outer structure and viton or silicon seals in closing the apparatus lid.

The apparatus of the present invention comprises air compressor devices and blowers to provide N2 or CO2 to purge vapors and non-condensable gases, as well as a heating gas feed and outflow assembly. The heating gas feed and outflow assembly comprises a hot gas inflow coupling, a hot gas inflow plenum, a lower mirror for homogenization of the flow of hot gas, an intermediary mirror, a heating gas capture duct, a heating gas outflow plenum and a heating gas outflow coupling.

The apparatus of the present invention also preferably comprises two cooling circuits. The first cooling circuit comprises the same heating pipework and is implemented by insufflation by a ventilator and by the outflow of hot gas into the chimney. In a second cooling circuit the internal cooling is by the circulation of inert gas ($N_2$ or $CO_2$) directly on the coal in the annular part of the tubes. The second cooling circuit comprises a purge channel, an outflow of vapors and non-condensable gases and the recirculation of neutral gases in a heat exchanger by Blower Roots.

The present invention also comprises a process for the thermal decomposition of any kind of organic material using the apparatus as previously described and comprises the steps of feeding organic material into the apparatus; heating with gases on the inside and outside of an annular region located in the concentric tubes inside the apparatus; processing with region located in the concentric tubes inside the apparatus; processing with extraction and condensation of oil; and cooling with gases; and tilting of the apparatus.

The process also comprises a conversion step that maintains a difference in temperature between the inflow and outflow of the hot heating gases in a process regime of approximately 15° C. Heating for conversion of the reaction material is carried out for approximately 3 hours, preferably, 165 minutes. The heating is carried out outside the outer tube and inside the intermediary tube and inner tube. Cooling for unloading the reaction material is carried out for approximately 2 hours.

In said process $N_2$ is pumped into the apparatus to expel the oxygen. Heating the reaction is carried out by means of feeding hot gas simultaneously to all tubes.

The process also comprises the steps of extraction and condensation of vapors and non-condensable gases generated in conversion.

The CBT reactor generally uses four main materials in its manufacturing: a) Carbon steel in the outer structure of the reactor operating at ambient temperature, b) stainless steel 310 or other similar refractory steel indicated for the working temperature of between 380° C. and 420° C., c) Refractory blanket, thermally insulating the outer structure of the reactor heat exchanger per se of the inner temperature and, d) viton or silicon seals in closing the reactor lid. The mechanical resistances of the materials existing on the market (bearings, etc.) allows the manufacturing of a CBT reactor with up to 64 tri-tubes (table 2).

The main external operations of the process of the reactor are: a) drying the raw materials in rotary dryers, fluid beds or turbodryers; b) feeding; c) generation of hot gas in furnaces using any kind of fuel; d) extraction and fractioned condensation or not of the vapors and non-condensable gases generated in conversion; and) thermal exchange carried out by means of cooling water tower and pump, heat exchangers of condensation of the vapors and the gas wash water; f) supply of $N_2$ or $CO_2$ g) unloading and processing of the coals.

To condense the monomers generated in the conversion of polymers (ethene, propene, etc.) the water cooling towers are substituted by freon or cryogenic refrigeration.

The feed hoppers are square or round boxes having bipartite butterfly valves for each tri-tube. After being loaded, the hoppers are hoisted by overhead crane, positioned on top of the reactor and unloaded. For larger reactors, the hoppers are divided in half or in quarters so as to respect the highway regulatory dimensions and also enable the loading of raw materials at their generation points.

Processing the coals can be simplified or complete. Processing is simplified when it is destined for fuels in bulk. It is complete in the case of recovered carbon black (NFR) obtained from the conversion of tires which first have a sorting step of the steel mesh followed by grinding and classification into particles smaller than 20 µm, 7 µm or 1 µm.

Although the CBT destroys organochlorides and dioxins by the hermeticity of the process and rupture of the heterogeneous bonds (C—O, C—H, C—Cl, C—N, Cl—O etc.), the apparatus of the present invention allows the total destruction of the dioxins by installing the molten salt bed (850° C.) at the outflow of the non-condensable gases for cases in which the raw material contains these pollutants.

In the use of an embodiment of the reactor of the present invention the following basic steps occur: drying the external raw material; simultaneous feeding of all the tri-tubes by hoppers having bipartite butterfly valves for each tri-tube; heating of the reactor by way of the hot gas generator using any kind of fuel; cooling of the reactor using the same system of air suction of heating (the furnace being turned on) for admitting the cold air; and extraction and fractioned condensation or not of the vapors and non-condensable gases generated in the conversion; cooling of the heat exchanger used in the condensation of vapors and of the heat exchanger of the gas washer by way of the freon or cryogenic cooling tower for monomers generated by the polymers.

The present invention uses compressed air compressors in its instruments and blowers for the supply of $N_2$ or $CO_2$ so as to purge the vapors and non-condensable gases. The processing can be simplified (dispatch or packaging) or complete (grinding and classification of the coals). Note that recovered carbon black (NFR) is produced from processing used tires. Sealing can be totally by the lid of the reactor or individual in each tri-tube. Unloading is carried out by tilting. There is a low generation of non-condensable gases in the processing of the reactor of the present invention. Heat recovery of the non-condensable gases as fuel from the furnace occurs when the gases do not contain potentially toxic compounds. The total elimination of dioxins and organochlorides is achieved by the passage of the non-condensable gases through the molten salt bed;

For a clearer understanding of the type of material to be concerted in the apparatus of the present invention, the raw materials are classified as follows:

I a: Clean Biomass: Wood, Reforestry Residues and Bushes (vegetable-type coal and tar); I b: Clean Biomass with Potassium contamination: Agricultural Residues, Grasses, Bagasse and Cane Straw (Vegetable Coal and Tar); II: Cakes, Brans, Grain Residues, Dry Fats, Meat Meal, Bone Meal, Blood meal, etc. (Fatty Oils and Coal); III: Excrements (chicken, pig and cattle manure), depending on the content of the earth, this class becomes Class II or Class IV (Fatty Oils and Coals); IV: Sludges of Household and Industrial Sewage Treatment Plant (Fatty Oils and Coals); V: Tires, Rubbers (Oil Limonene/Aromatic and Recovered Carbon Black—NFR); VI: Plastics and Polymers (Monomers and Coals); Special: Destruction of organochlorides and dioxins (PCB, HCB, PCDD and PCDF) contained in residues and contaminated soils (Monomers, Ashes and Coals).

TABLE 1

Apparent Specific Average Masses of Various Raw materials

| Class | Raw material | Kg/m³ |
|---|---|---|
| Ia | Clean Biomass: Wood, Reforesty Residues and Bushes | 150 |
| Ib | Clean Biomass with potassium contamination: Agricultural Residues, Grasses, Bagasse and Cane Straw | 150 |
| II | Cakes, Brans, Grain Residues, Dry Fats, Meat Meal, Bone Meal, Blood meal, etc. | 580 |
| III | Excrements (chicken, pig and cattle manure), depending on the content of the earth, this class becomes Class II or Class IV | 560 |
| IV | Sludges from household and industrial sewage treatment plant | 550 |
| V | Tires, Rubbers | 560 |
| VI | Plastics and Polymers | 330 |
| Special | Contaminated soils | 1.600 |

TABLE 2

Weights of Various Reactor Arrangements

| | Reactor Masses - t | | |
|---|---|---|---|
| Reactor Type | Unloaded | Loaded with raw material class IV | Loaded with raw material Special class |
| CBT - 36 or 33 Tubes | 45 | 87 | 167 |
| CBT - 49 or 45 Tubes | 60 | 117 | 226 |
| CBT - 64 or 61 Tubes | 80 | 154 | 297 |

BRIEF DESCRIPTION OF THE FIGURES

FIG. 1.1 illustrates a front view of the CBT reactor with a tri-tube which is an object of the present invention.

FIG. 1.2 illustrates the CBT reactor with a tri-tube which is an object of the present invention in horizontal cut A-A.

FIG. 1.3 illustrates the CBT reactor with a tri-tube which is an object of the present invention in vertical cut B-B.

FIG. 1.4 illustrates the CBT reactor with a tri-tube which is an object of the present invention in a perspective view.

FIG. 2.1 illustrates a front view of the CBT reactor with 32 tri-tubes which is an object of the present invention.

FIG. 2.2 illustrates the CBT reactor with 32 tri-tubes which is an object of the present invention in horizontal cut A-A.

FIG. 2.3 illustrates the CBT reactor with 32 tri-tubes which is an object of the present invention in vertical cut B-B.

DETAILED DESCRIPTION OF VARIOUS EMBODIMENTS OF THE INVENTION

Figure 3:
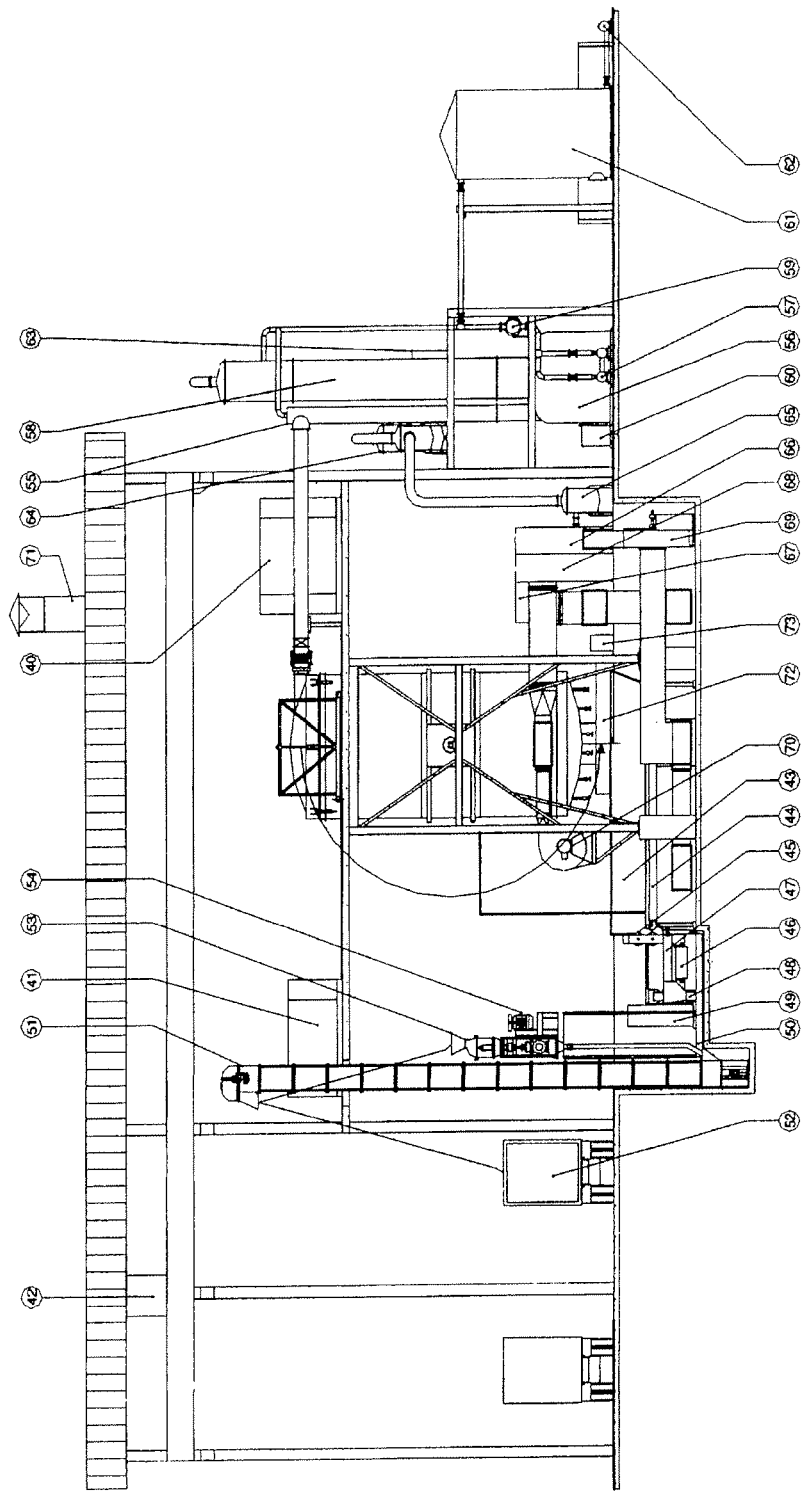
FIG. 3 illustrates an example of a typical layout of the Installations of a CBT reactor which is an object of the present invention.

FIGS. 1.1 to 1.4 and 2.1 to 2.3 illustrate the CBT reactors of the present invention with 1 tri-tube and 32 tri-tubes, respectively, which use the same concept differentiating amongst themselves in size only. Parts 1 to 5 comprise the structure support 1, the outer box 2, the tilting axis 3, the motor-reducer 4 and thermal insulation of the reactor 5. Parts 7 to 10 form the tri-tube assembly which comprises an inner tube 7, the intermediary tube 8, the outer tube 9 and the purge tube 10. The tri-tube constitutes the main item of the present invention and is part 8 of the concepts, namely: fixed bed reactor, heat exchanger, inert gas drag bed, size of viabilization by virtue of low thermal conduction caused by the coal formed during the process (thermal insulation), cooling with neutral gas ($N_2$ or $CO_2$) directly to overcome the thermal insulation of the coal formed, coincidence of size of prior item with the size of passenger car tires, useful occupation of approximately ⅓ of the total volume of the reactor and low impedance in the fluidodynamics of the heating gas and cooling outside the tri-tube.

Parts 11 to 17, comprise the gas inflow coupling 11, hot gas inflow plenum 12, lower mirror 13 (hot gas flow homogenizer), intermediary mirror 14, heating gas capture duct 15, heating gas outflow plenum 16 and heating gas outflow coupling 17. Said parts show the feeder assembly and outflow of hot gas generated by the furnace. Part 18 shows the upper mirror which supports the load of the tri-tubes in operation (vertical position) and during the tilting assisted by the parts 13 (lower mirror) 14 (intermediary mirror), 16 (hot gas inflow and outflow plenum) with reduced thermal loss for the outer structure due to the use of stainless steels and thermal insulation. Part 19 (FIGS. 1 and 2) shows the lid of the reactor, which is closed by way of a hydraulic cylinder. Said lid 19 is sealed by way of soft and hard rubbers around it. Part 25 shows the outflow of vapors and gases installed in the lid 19, which is connected to the venturi 55 (FIG. 3) by coupling 27 driven by hydraulic cylinders 28. Part 29 shows the lid movement cart with a locking system and rotational movement on rails. Part 37 is a possible substitution of 4 to 5 tri-tubes which can receive passenger car tires by a tri-tube that can receive truck tires (FIG. 2.2). The ratio of passenger car tires to truck tires is 20/1 and it is suffice to install a single tri-tube in each reactor to process the truck tires. The distance between the outer tube 9 and the intermediary tube 8 of the tri-tube for truck tires strays from the efficient distance of heat transfer, this drawback being compensated by the increase in reaction time (two consecutive batches) by blocking its unloading after the first reaction. Blocking is carried out by a locking device that may or may not be mounted on the apparatus itself.

FIG. 2.1 shows a CBT reactor with 32 tri-tubes, which has a circular section and can also be constituted with a square section. In this case, the reactor will have 4 tri-tubes more than the prior version. It is noted that the tri-tube of the present invention can have a section in any shape, provided that the effective distance for the heat transfer is maintained. This arrangement has a greater investment cost, but a lower operating cost due to greater production by batch. Industrial practice will show which of the arrangements is economically more advantageous.

The CBT reactor with 1 tri-tube and the CBT reactor with 32 tri-tubes also comprise a global lid 19 for the tri-tubes with hermetic sealing rings made of cooled rubber 23, hydraulic cylinder 24 with rotary engagement to pressure the lid against the rings supported on the body of the reactor, thermal insulation 5 (for example, ceramic fiber) upper mirror 18 and support structure 1. This same global lid is applied to receive a square section. The main difference is that the structure is a profile I in the square section reactor and having a U-shaped profile in the circular section reactor. The CBT reactor can also operate with the option of an individual lid for each tri-tube. The parts are the same as the prior options, the only variation being their positioning in the reactor. The vapors and non-condensable gases outflow coupling of the global lid option comprises the following parts: vapors and non-condensable gases outflow 25, flange 26, expansion joint 27 and hydraulic cylinder 28. The disengagement of the parts 25 to 28 permits lid movement on the cart in order to release the tilting of the reactor; part 27 is the expansion joint and part 28 is a hydraulic cylinder which retracts the engagement; the coupling assembly is fixed on the venturi pipework 55 (FIG. 3) of condensation of the vapors and cooling of the non-condensable gases.

A typical layout of the CBT Reactor Installation is illustrated in FIG. 3 where there occurs the feeding and unloading of the coal. A tire feed hopper 40 has bipartite butterfly valves for each tri-tube; the hopper is placed in stand-by position. The feed hopper 41 of contaminated sludges, etc., is in stand-by position. An overhead crane 42 takes the hoppers from the carts and raises to the stand-by position and subsequent to the top of the reactor for feed operation; the overhead crane is also used for mounting and maintaining the equipment. The unloading hopper 43 receives the coal from the tilting of the reactor, such that they follow on to conveyor belt 44 and to the de-agglomerator roll 45, falling onto the conveyor belt 46. In cases of tires, the steel is sorted by an electromagnet 47, then on to the conveyor belt 48 and to the baler 49. After the conveyor belt 46 the coal follows down the snail 50 which transfers it to the bin elevator 51 which unloads the coal into the container 52 when it is used for energy purposes (fuel). In the case of tire proceeding to obtain recovered carbon black (NFR), the bin elevator 51 unloads the coal (NFR) into the hammer mill 53 and then to the classifier 54, having a baghouse which releases the classified end product to the Big-Bag bagger or into paper bags.

The outflow of vapors and non-condensable gases 25 leads to the venturi 55 condensing in the tank 56 from where they are pumped by the pump 57 to the condensation tower 58 by the heat exchanger 59. After condensation, the oil passes through the water/oil centrifuge 60 and then to the tank 61 having a storage pump 62. The non-condensable gases are suctioned by the ventilator 63 which transfers them to the demister 64 (condensed sorter) and are conveyed to the furnace 66. In polymer processing, the non-condensable gases (monomers) are condensed by cooling or cryogeny. For CBT reactors dedicated to the processing of raw materials containing organochlorides and dioxins, the non-condensable gases pass through a high temperature burner and molten salt bed. The non-condensable gases after passing through the hydraulic seal 65 are burned in the high temperature furnace 66 with an auxiliary fuel flame (GLP, GN, Acethylene, etc.) such that these combustion gases pass through the molten salt bed 68 where the final destruction of the organochlorides and dioxins occurs. When the chloride content in the raw materials is low, the non-condensable gases are immediately burned in the biomass furnace 67. The combustion gases from both furnaces 66, 67 join the hot gas piping of the reactor suctioned by the hot gas ventilator 69. The temperature control is by way of the cold air damper (valve) in the hot air pipework.

There are two cooling circuits. The outer circuit comprises the same heating pipework, which is carried out by insufflation by the ventilator 70 and by the hot gas outflow into the chimney 71. By virtue of coal's low thermal conductivity, internal cooling is needed by circulating inert gas ($N_2$ or $CO_2$) directly on the coal in the annular part of the tri-tubes, with a view to decreasing the cooling period. Accordingly, the purge channel 10 and the vapors and non-condensable gases outflow 25 are used, but the neutral gases in the heat exchanger 72 are recirculated by Blower Roots 73.

The sludges, cakes, excrements, etc. need to be dried with a maximum of 5% humidity to avoid oxidation of the oils. This drying is carried out in the dryer assembly by using any kind of dryer (rotary drum, fluid bed or turbodryer), using the reactor's hot heating gases exhaustion.

In the present invention other peripheral equipment items not-illustrated also act, comprising the following units: water cooling tower, or freon or cryogenic cooler, water pumps, compressor, compressed air tank, tank and nitrogen or $CO_2$ blower.

Figure 4:
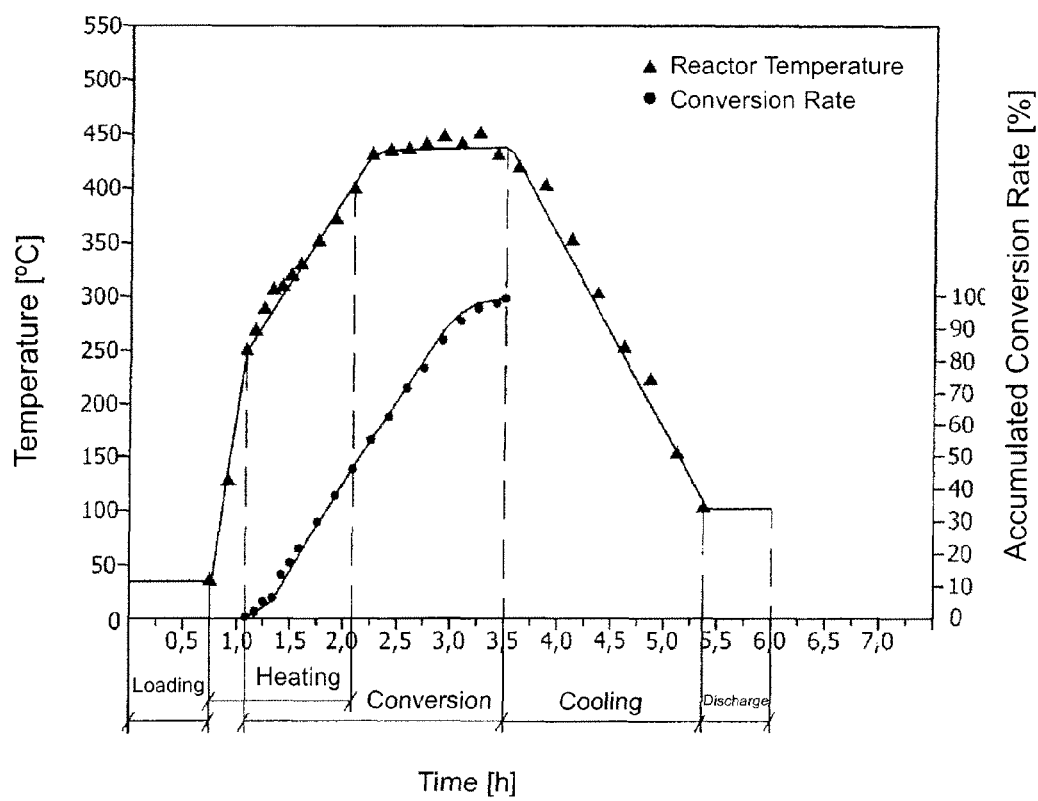
FIG. 4 illustrates a heating and cooling curve of the CBT Reactor and the accumulated rate of reaction of the matter contained in the reactor of the present invention.

FIG. 4 illustrates a heating and cooling curve of the CBT reactor and the accumulated conversion rate (raw material fraction that turns into coal, oil and non-condensable gases) of the matter contained in the reactor. Adding the loading and unloading period, the total processing time is approximately 6 to 8 hours permitting 4 to 3 batches per day.

The apparatus of the present invention carries out the thermochemical almost isothermal conversion of any kind of organic material in various types of oils, coals and non-condensable gases according to the type of raw material used. The neo-isothermal reactors are situated in a narrow viability range dictated by the temperature difference $\Delta T$ between the inflow and outflow temperature of the heating means. When $\Delta T$ decreases (tending towards zero) there is an annulment of the heat transfer capacity of the heating means to the raw material which is being processed. Increasing the heat transfer capacity with the objective of widening the processing capacity so to achieve economic viability, requires an increase in $\Delta T$, that is, an increase in the inflow temperature and/or decrease in the outflow temperature of the heating means. The first (increase in inflow temperature) is limited by the maximum decomposition temperature of the oils (450° C.) and the second (decrease in outflow temperature) is limited by the minimum thermochemical conversion temperature of the organic materials (380° C.). Streamlining the processes such as good processing capacity simultaneously with good quality of the products (oils and coals) depends on decreasing the temperature interval of $\Delta T=70°$ C. (Max.) to $\Delta T<15°$ C.

The invention has achieved a satisfactory conversion period of 3 hours dictated by the fact that the coals formed during the process are insulating materials, hampering the transfer of heat with the processing time. The invention solves this issue by limiting the heat transfer distance to approximately 175 mm between the maximum external diameter of $\varnothing=650$ mm and the minimum internal diameter of $\varnothing=300$ mm, both receiving heat from the heating means. The annular space between the diameters above is the useful loading space of the reactor with raw material to be processed resulting in a useful section rate of approximately 33% given by the following typical but not limitative examples: section of typical reactor=5.3×5.3 m; # of tri-tubes=36; useful loading section $\pi/4$ ($\varnothing$ ext$^2$−$\varnothing$ int$^2$)=$\pi/4$ (0.65$^2$−0.3$^2$)=0.261 m$^2$; useful section rate=36×0.261/5.3×5.3=0.33=33%. The same Period for heating the loaded reactor is also used for cooling the load to below 100° C. before opening it in order to avoid spontaneous combustion of the coals.

Heat Transfer in the Tri-Tube

Figure 5:
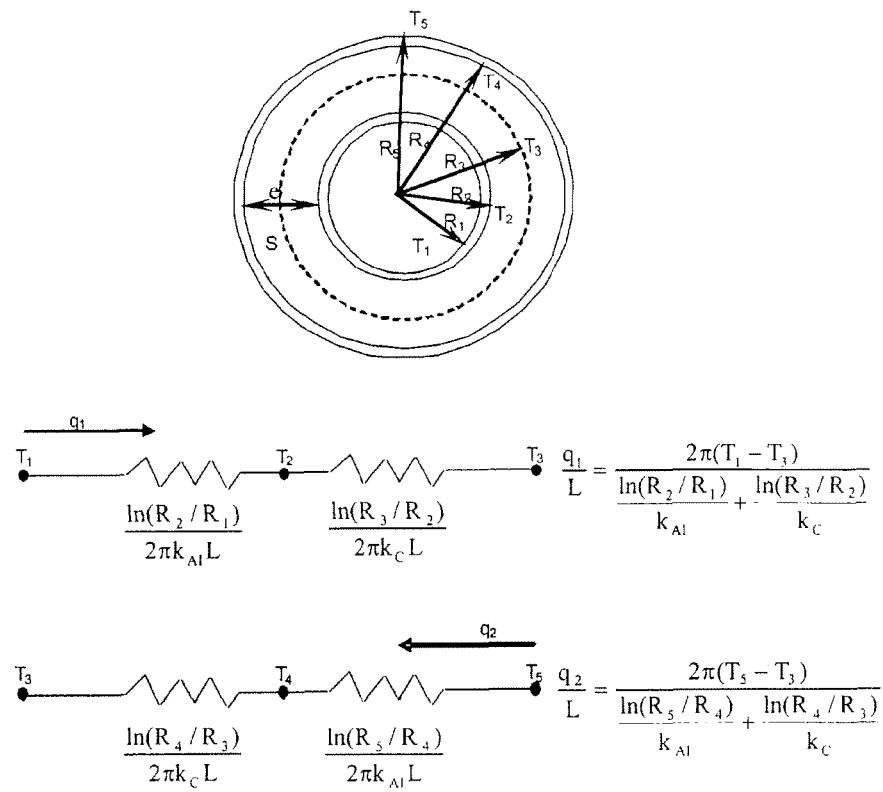
FIG. 5 illustrates the heat flows by unit of length transferred by conduction to the tri-tube and their respective equations.

It is noted that the heat flow transferred by conduction to the tri-tube occurs simultaneously by two means, namely: a) from the inside of the intermediary tube to the center of the annular region of the tri-tube b) from the outside of the outer tube to the center of the annular region of the tri-tube. FIG. 5 presents the two flows of heat transferred by conduction to the tri-tube and their respective equations, wherein: $T_1=T_5$ and $T_3$ are the temperatures in the hot and cold regions respectively; $R_1$, $R_2$, $R_3$, $R_4$ and $R_5$ the radii of the straight section of the tri-tube; and a width of the annular region of the tri-tube; S the annular area of the tri-tube; $k_{Al}$ and $k_C$ the thermal conductivities of stainless steel 310S and the coal formed during low temperature conversion.

The heat flow by conduction is absorbed by the heating heat rate of the tri-tube with a raw material the equations of which are set forth below:

$$Q = [(m_{Al}Cp_{Al}) + (m_C Cp_C)](T_1 - T_3)$$

$$Q = [(\rho_{Al}S_{TT}LCp_{Al}) + (\rho_C SCpL)](T_1 - T_3)$$

$$\frac{Q}{L} = \rho_{Al}Cp_{Al}(T_1 - T_3)[\pi(R_2^2 - R_1^2) + \pi(R_5^2 - R_4^2)] + \rho Cp(T_1 - T_3)2\pi e R_3$$

The result of dividing by time t for heating the raw material in oil and coal is:

$$\frac{Q}{L \times t} = \left(\frac{\rho_{Al}Cp_{Al}(T_1 - T_3)}{t}\right)(\pi(R_2^2 - R_1^2) + \pi(R_5^2 - R_4^2)) + \left(\frac{\rho Cp(T_1 - T_3)}{t}\right)2\pi e R_3$$

wherein Q is the heat required to convert the raw material, L the length of the tri-tube, t the heating time, $\rho_{Al}$ the density of the stainless steel 310S, $Cp_{Al}$ the specific heat of the stainless steel, $\rho$ the density and Cp the specific heat, where the latter two are average values, nearest to the coal formed than the initial raw material.

It was noted that both the heat flow by conduction as a heating heat rate vary in relation to the annular width of the tri-tube. This study analyzed the behavior of both cases based on the annular width.

Adjustment of the Heat Transfer Equations to the Experiment Data

Heat Transferred by Conduction to the Tri-Tube

Temperature inside the intermediary tube of the tri-tube: $T_1$: 420° C.

Temperature on the average diameter of the tri-tube: $T_3$: 25° C.

Temperature on the outside of the outer tube of the tri-tube: $T_5$: 420° C.

Average temperature of the tri-tube: $T_m=(420+25)/2=222.5°$ C.

Thermal conductivity of stainless steel 310S at temperature $T_m$: $k_{Al}=18.69$ W/m° C.

Average thermal conductivity, nearest to coal formed at temperature $T_m$: $k_c=0.9868$ W/m° C. (this figure is in the same order as coke conductivity of 0.9519 W/m° C.)

Annular width of the tri-tube: e=175 mm

Width of the stainless steel sheeting 310S: $e_{Al}$: 3 mm

Average radius of the tri-tube: $R_3=230$ mm

Outer radius of the intermediary tube of the tri-tube: $R_2=R_3-e/2=230-87,5=142,5$ mm Inner radius of the intermediary tube of the tri-tube: $R_1=R_2-e_{Al}=142,5-3=139,5$ mm Inner radius of the outer tube of the tri-tube: $R_4=R_3+e/2=230+87,5=317,5$ mm Outer radius of the outer tube of the tri-tube: $R_5=R_4+e_{Al}=317,5+3=320,5$ mm Heat flow transferred by the intermediary tube of the tri-tube: $q_1/L$ Heat flow transferred by the outer tube of the tri-tube: $q_2/L$ Total heat flow transferred to the tri-tube:

$$\frac{q}{L} = \frac{q_1}{L} + \frac{q_2}{L}$$

$$\frac{q}{L} = \frac{2\pi(T_1 - T_3)}{\frac{\ln(R_2/R_1)}{k_{Al}} + \frac{\ln(R_3/R_2)}{k_C}} + \frac{2\pi(T_5 - T_3)}{\frac{\ln(R_5/R_4)}{k_{Al}} + \frac{\ln(R_4/R_3)}{k_C}} \ldots [kW/m]$$

$$\frac{q}{L} = \frac{2\pi(240 - 25)}{\frac{\ln(0.1425/0.1395)}{18.69} + \frac{\ln(0.230/0.1425)}{0.9868}} +$$

$$\frac{2\pi(420 - 25)}{\frac{\ln(0.3205/0.3175)}{18.69} + \frac{\ln(0.3175/0.230)}{0.9868}}$$

$$\frac{q}{L} = \frac{2481.86}{1.138 \times 10^{-3} + 0.4851} + \frac{2481.86}{5.032 \times 10^{-4} + 0.3267}$$

$$\frac{q}{L} = 5.104.21 + 7.584.82 = 12.689.03 \ W/m = 12.6890 \ kW/m$$

Heating Heat Rate of the Raw Material

Specific average heat, nearest the coal formed at temperature $T_m$: $C_P$: 1.0200 kJ/kg° C. (this figure is in the same order as the specific heat of coke of 1.0366 kJ/kg° C.)
Specific heat of stainless steel 310S at temperature $T_m$: $Cp_{Al}$: 0.46 kJ/kg° C.
Average density: $\rho$=550 kg/m$^3$
Density of stainless steel 310S: $\rho_{Al}$=7.900 kg/m$^3$
Heating time of the tri-tube between 25° C. and 420° C.: t=t: 5.400 s
Heat rate needed to heat the raw material mass $$\frac{Q}{L \times t} =$$

$$\left(\frac{\rho_{Al} Cp_{Al}(T_1 - T_3)}{t}\right)[\pi(R_2^2 - R_1^2) + \pi(R_5^2 - R_4^2)] + \left(\frac{\rho Cp(T_1 - T_3)}{t}\right)(2\pi e R_3)$$

$$\frac{Q}{L \times t} = \left(\frac{(7.900)(0.46)(420 - 25)}{5.400}\right)(0.008671) +$$

$$\left(\frac{(550)(1.0200)(420 - 25)}{5.400}\right)(2\pi)(0.175)(0.230)$$

$$\frac{Q}{L \times t} = 2.3049 + 10.3780 = 12.6828 \ kW/m$$

Analysis of Heat Transfer Curves

Figure 6:
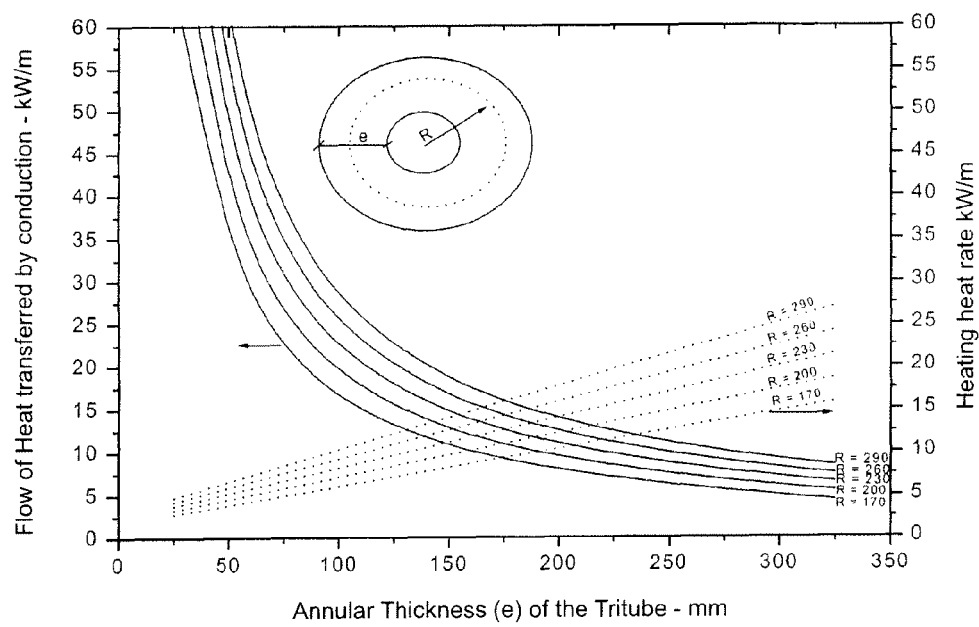
FIG. 6 illustrates the variation of the heat flow transferred by conduction by the coal formed and of the heating rate in relation to the annular width of the tri-tube.

FIG. 6 presents the variation of the heat flow transferred by conduction and the heating rate in relation to the annular width of the tri-tube maintaining the other parameters constant. The following points are emphasized:

The set of experiment data from the materials and the figures for thermal conductivity and specific heat near the coke coal, results in an annual width of 175 mm. This width, besides allowing the treatment of unusable whole tires from passenger cars, assures the viability of an economic productivity for treating various materials (sludges, slurries, cakes, brans, wood, etc.).

The thermal conductivity of the stainless steel is not a determining factor and the conductivity of the coal determines the heat conduction and consequently all the dimensions of the tri-tube and the conversion process of the present invention.

It is noted that the heat rate of stainless steel represents merely 18.3% of the total heating rate, that is, the raw material and products (coal) are the determining factors thereof.

The reason why the performance of the tri-tube is identical to all the raw materials is that the thermal behavior is determined by the properties of the coal and all the raw materials are ultimately converted into a coal having properties similar to those of coke.

The heat flow of the inner tube represents 40% of the total flow and of the outer tube 60%. A fifty-fifty distribution is impossible because it would result in $R_3/R_2=R_4/R_3 \therefore R_3^2=R_2R_4 \therefore R_3^2=(R_3-e/L)(R_3+e/L)=R_3^2-(e/L)^2 \therefore e/L=0$.

If the increase in conversion time with the annual width were taken into account, it would result in lesser amounts for the heating heat rate for greater figures of the annual width and consequently a crossing in the two curve families of e>175 mm. The large increase in heating time, due to the asymptotic behavior of the heat flow curve, results in a lower daily production and renders the technology economical unviable. The above analysis shows that the annular width of the tri-tube of 175 mm is around the optimal value, and is determined by the thermal conductivity and specific heat of the coal formed, which are near the coke values whatever the initial raw material may be.

Another detail of the invention is the batch operation with loading by the upper lid and unloading by tilting by rotation around its axis which passes through the center of gravity. The lid is sealed by cooled sliding O-shaped rings (viton or silicon) giving the reactor a hermetic characteristic (free of oxygen) to prevent oxidation of the oil and coal formed. Accordingly, the invention maximizes the yield of the products represented by about 40% to 60% of coal, 10% to 30% of oil, 10% to 15% of water and 10% to 20% of and non-condensable gases in relation to the initial raw material. Opening the lid is by a small pneumatic lifting and side sliding by a motorized cart.

Another detail of the invention is its capacity to process various types of raw materials generating different products, classed as follows: I a: Clean biomass: Wood, Reforestry Residues and Bushes generating vegetable-type coal and tar; I b: Clean biomass with Potassium contamination: Agricultural residues, Grasses, Bagasse and Cane Straw, also generating vegetable-type coal and tar; II: Cakes, brans, grain residues; Dry Fats, Meat Meal, Bone Meal, Blood meal, etc. generating fatty oils and coal; III: Excrements (chicken, pig and cattle manure and other animals), generating fatty oils and coal; depending on the content of the earth this class becomes Class II or Class IV; IV: Sludges from Household and Industrial Sewage Treatment Plans, generating fatty oils or coal; V: tires, Rubbers generating limonene/aromatic oils, monomers and recovered carbon black—NFR, VI: Plastics and polymers in general generating the original monomers, coals with ash and non-condensable gases at freon or cryogenic temperature and, Special class: destruction of organochlorides and dioxins (PCB, HCB, PCDD and PCDF) contained in residues and contaminated soils.

The use capacity of various classes of raw materials and obtaining various types of oil and coals, associated to the characteristics of temperature, time and hermeticity described previously, ensures various economic alternatives never before achieved by similar devices. It is noted that nitrogen or $CO_2$ is used as drag gas to decrease the time of performance of the oil vapors in the reactor to avoid decomposition thereof.

There is a broad processing capacity range with models, which begins with a 1 tri-tube. For example, there may be models having 9 tri-tubes (average of 31 t/day) 64 tubes (average of 220 t/day) or even more. The smaller sizes are limited by the economic results and the greater sizes by the mechanical resistance of the materials in support of the total loads of the apparatus (own weight+raw material) which can achieve countless tons in total. The use of special high resistance steels in the structure of the apparatus and superlinks in the piping will permit the manufacture of reactors with large capacity and with the possibility of activation with vapor up to 850° C. The useful length of the device of the tri-tube is variable, and can be increased depending on the use of the advanced materials mentioned above.

Loading the apparatus is by hoppers having bipartite butterfly valves positioned above each tri-tube. The hoppers are previously loaded near the CBT or at the origin of generation of the raw materials and transported to the CBT in trucks and hoisted by overhead cranes to the floor at the reactor feed level. The hoppers are in stand-by position and after the reactor has unloaded the prior reaction, it returns to the loading position. Afterwards, the hoppers are positioned on the apparatus, and the bipartite butterfly valves are opened, quickly completing the loading (approximately 4 minutes). For example, the hoppers can be single in the case of small apparatus (1 and 16 tubes), double in the case of average-sized apparatus (25, 36 and 49 tubes) and quadruple in the case of giant apparatus (64 tubes or more). The division of the hoppers allows them to have widths within the highway regulatory standards (max. 3.20 m) allowing 'just-in-time' operations between supply and processing of biomass eliminating the need for large deposits of biomass and residues. The modulations of the reactors, subdivision of the hoppers having widths within the highway regulatory standards, load capacity supported by the structural materials determine the size of the apparatus of the present invention.

The reactor of the present invention also enables fast unloading (approximately 2 minutes) of the solid products by way of tilting around the axis passing through the center of gravity of the apparatus. Unloading is carried out on a vibrating hopper which transports the solid products for the steps of finishing according to market demands (rolls or disintegrating mills, shakers, magnetic separators, hammer or disk mills having classifiers and packaging).

Patent Key: An Apparatus for Low Temperature Conversion

| Item | Description |
|---|---|
| 01 | Reactor support structure |
| 02 | Outer structural box |
| 03 | Tilting axis |
| 04 | Motor-reducer of the reactor |
| 05 | Thermal insulation |
| 06 | Tri-tube assembly |
| 07 | Smallest inner tube of the tri-tube |
| 08 | Intermediary tube of the tri-tube |
| 09 | Outer tube of the tri-tube |
| 10 | Inert gas inflow tube/purge of heavy oil of the tri-tube |
| 11 | Hot gas inflow coupling |
| 12 | Hot gas inflow plenum |
| 13 | Lower mirror |
| 14 | Intermediary mirror |
| 15 | Heating gas capture duct |
| 16 | Heating gas outflow plenum |
| 17 | Heating gas outflow coupling |
| 18 | Upper mirror |
| 19 | Reactor lid |
| 20 | Lid structure |
| 21 | Thermal insulation of the lid |
| 22 | Coating sheet |
| 23 | Lid sealing |
| 24 | Lid Sealing Hydraulic Cylinder |
| 25 | Outflow of vapors and non-condensable gases |
| 26 | Vapors and non-condensable gases outflow coupling |
| 27 | Expansion joint |

-continued

| Item | Description |
|---|---|
| 28 | Vapors and non-condensable gases outflow coupling cylinder |
| 29 | Lid raising cart |
| 30 | Lid vertical movement guide |
| 31 | Lid movement current |
| 32 | Lid raising gear |
| 33 | Current roll gear |
| 34 | Gear axis turn cylinder |
| 35 | Cart structure |
| 36 | Rotation |
| 37 | Substitution of 4 or 5 tri-tubes of passenger tires for a tri-tube for truck tire |
| 38 | Raw material (eg.: whole tire) |
| 39 | Reactor CBT - 32 Tubes |
| 40 | Tire feeder |
| 41 | Sludge feeder |
| 42 | Overhead crane |
| 43 | Coal uploading Hopper |
| 44 | Coal transfer conveyor belt |
| 45 | Coal/steel de-agglomerator |
| 46 | Coal conveyor belt |
| 47 | Electromagnet |
| 48 | Residual steel conveyor belt |
| 49 | Steel baler |
| 50 | Clean coal snail |
| 51 | Coal bin elevator |
| 52 | Clean coal container |
| 53 | Hammer mill |
| 54 | Carbon black classifier |
| 55 | Venturi |
| 56 | Condensed tank |
| 57 | Oil recirculation pump |
| 58 | Condensation tower |
| 59 | Heat exchanger |
| 60 | Water/oil centrifuge |
| 61 | Oil storage tank |
| 62 | Oil storage tank pump |
| 63 | Non-condensable gases ventilator |
| 64 | Demister |
| 65 | Hydraulic Seal |
| 66 | Furnace |
| 67 | Molten salt bed |
| 68 | Hot gas ventilator |
| 69 | Cooling ventilator |
| 70 | Chimney |
| 71 | Heat exchanger |
| 72 | Blower Roots |

The invention claim is:

1. Apparatus for thermal decomposition of any kind of organic material comprising: an outer box with a hermetic lid; a thermal insulation layer disposed throughout an inner surface of the outer box and the lid; and at least one structure disposed in the inner space of the outer box and having three concentric tubes disposed therein, said structure being positioned substantially vertically, and having a wall width suitable for heating by gases from an inner and outer side of said structure.

2. Apparatus according to claim 1, wherein said structure with three concentric tubes comprises an inner tube, an intermediate tube, and an outer tube, said heating being realized on the outer and inner side of an annular region of the tubes.

3. Apparatus according to claim 2, wherein a spacing between an inner wall of the outer tube and an outer wall of the intermediate tube is 175 mm.

4. Apparatus according to claim 1, wherein said structure with three concentric tubes has substantially thin walls with a width varying between 2 to 5 mm, and a length substantially equal to that of the apparatus.

5. Apparatus according to claim 4, wherein said width between said substantially thin walls is 3 mm.

6. Apparatus according to claim 1, wherein the heat flow for heat transferred by conduction to the three concentric tubes occurs simultaneously on the inside of the intermediate tube to the center of the annular region of the three concentric tubes and on the outside of the outer tube to the center of the annular region of the three concentric tubes, the gases used for heating having no physical contact with the material to be decomposed.

7. Apparatus according to claim 1, wherein at least one element carries out said heating so as to provide a temperature difference between an inflow and an outflow of the gases of 15° C.

8. Apparatus according to claim 1, wherein said apparatus is a batch operation reactor.

9. Apparatus according to claim 1, wherein the material used in the outer box is carbon steel.

10. Apparatus according to claim 1, wherein the material used in the concentric tubes is 310 stainless steel.

11. Apparatus according to claim 1, wherein the material used in the concentric tubes is resistant to temperatures between 380° C. and 420° C.

12. Apparatus according to claim 1, wherein the material used inside the outer box and the lid is a refractory blanket for thermal insulation of the outer structure, and at least one of fluoroelastomer or silicon seals in sealing the lid of the apparatus.

13. Apparatus according to claim 1, further comprising air compression devices and blowers to supply the N2 or CO2 to purge vapors and non-condensable gases.

14. Apparatus according to claim 1, further comprising a heating gas feed and outflow assembly.

15. Apparatus according to claim 1, further comprising a heating gas feed and outflow assembly comprising a hot gas inflow coupling, a hot gas inflow plenum, a lower homogenizer for homogenization of the hot gas flow, an intermediary homogenizer, a heating gas capture duct, a heating gas outflow plenum, and a heating gas outflow coupling.

16. Apparatus according to claim 1, further comprising two cooling circuits.

17. Apparatus according to claim 16, wherein a first cooling circuit comprises the same heating pipework and is carried out by insufflation by a ventilator and by the hot gas outflow into the chimney.

18. Apparatus according to claim 16, wherein a second cooling circuit comprises internal cooling by the circulation of inert gas (N2 or C02) directly on the coal in the annular part of the tubes.

19. Apparatus according to claim 18, wherein the inert gas is selected from a group consisting of N2 or CO2.

20. Apparatus according to claim 18, wherein the second cooling circuit comprises a purge channel, a vapors and non-condensable gasses outflow, and the recirculation of neutral gasses in a heat exchange via a blower.

21. Process for thermal decomposition of any organic material, said process using the apparatus as defined in claim 1 to perform the steps of: feeding organic material into the apparatus; heating with gases inside and outside of an annular region located in the concentric tubes inside the apparatus; processing with extraction and condensation of oil; cooling the material with air cooling gases with indirect heat transfer; and tilting of the apparatus.

22. Process according to claim 21, further comprising the step of:
introducing hot heating gas simultaneously by the outer wall of the structure with three concentric tubes by the region between an inner tube and an intermediary tube of the structure and leaving said gas by the smallest inner tube called bayonet, in order to maintain a temperature difference between the inflow and outflows of hot heating gasses in a process regime of 15° C.

23. Process according to claim 21, wherein the heating for conversion of the reaction material is carried out for three hours.

24. Process according to claim 21, wherein the heating for conversion of the reaction material is carried out for 165 minutes.

25. Process according to claim 21, wherein the heating is carried out outside the outer tube and inside the intermediary tube and inner tube.

26. Process according to claim 21, wherein the unloading of the reaction material is carried out for two hours.

27. Process according to claim 21, wherein N2 is inserted inside the apparatus to expel the oxygen.

28. Process according to claim 21, wherein the heating is carried out by way of feeding the hot gas simultaneously to all the tubes.

29. Process according to claim 21, further comprising the steps of:
extraction and condensation of vapors and non-condensable gases generated in the conversion.

* * * * *

UNITED STATES PATENT AND TRADEMARK OFFICE
CERTIFICATE OF CORRECTION

PATENT NO. : 8,603,404 B2  Page 1 of 1
APPLICATION NO. : 13/124793
DATED : December 10, 2013
INVENTOR(S) : Pinatti et al.

It is certified that error appears in the above-identified patent and that said Letters Patent is hereby corrected as shown below:

On the Title page,
Item [73] delete "RM Materials Refratarios Ltda." and insert --RM Materiais Refratarios Ltda.--.

Signed and Sealed this
Fifteenth Day of April, 2014

Michelle K. Lee
*Deputy Director of the United States Patent and Trademark Office*